3,395,135
POLY(2-BUTYNEDIOL-1,4)
Wiley E. Daniels, Easton, Pa., assignor to General Aniline & Film Corporation, New York, N.Y., a corporation of Delaware
No Drawing. Filed Nov. 8, 1963, Ser. No. 322,495
1 Claim. (Cl. 260—91.3)

This invention relates to poly(butynediol), a new polymer of 2-butynediol-1,4 having several useful commercial applications.

I have discovered that when 2-butynediol-1,4 is refluxed with a solution of bis(triphenylphosphine) nickel bromide, prepared in accordance with the procedure described by Venanzi, Jour. Chem. Soc., 719, 1958, in substantially pure tetrahydrofuran in a system open to the atmosphere for about 24 hours, a light colored solid polymer is obtained which is insoluble in water, alcohols and benzene. The polymer, poly(butynediol) or poly(2-butynediol-1,4), which are synonymous, is useful in semiconductors, rocket fuel compositions, and as a chemical intermediate.

The following examples will illustrate the preparation of poly(2-butynediol-1,4) and its application:

EXAMPLE I

A solution of 5 grams of bis(triphenylphosphine) nickel bromide and 86 grams (1.0 mole) of 2-butynediol-1,4 in 250 mls. of purified tetrahydrofuran was refluxed in a system open to the atmosphere for 24 hours. A light colored solid was precipitated at the end of this time. It was then filtered, washed with water several times and the solid dried at 70 mm. of mercury for several days. The amount of bright solid polymer was approximately 3 grams.

The polymer is insoluble in water, alcohols, tetrahydrofuran and benzene. It is infusible and probably cross-linked to some degree. Elementary analysis, after correction for catalyst end group residues, showed 55.3% of carbon, 5.5% of hydrogen, and 39.2% of oxygen by difference, whereas the atomic formula $(C_4H_6O_2)_n$ of the poly(2-butynediol-1,4) requires (calculated) 55.7% of carbon, 6.9% of hydrogen and 37.2% of oxygen by difference.

The infrared spectrum of poly(2-butynediol-1,4) showed a very strong hydroxyl absorption at 3320 cm.$^{-1}$. The —C=C— stretching vibration was very strong at 1580 cm.$^{-1}$. The adsorption showed two bands located at 995 and 1020 cm.$^{-1}$. The 1020 cm.$^{-1}$ band originated from the OH deformation of the —CH$_2$OH group. The polymer has a weak adsorption at 688 cm.$^{-1}$ which can be assigned to —CH out of plane deformation vibration of cis HC=CH. The polymer has the following structure:

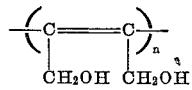

which is consistent with its infra-red spectrum.

In view of the insolubility of poly(2-butynediol-1,4) in water and the organic solvents so far tried it was impossible to determine the molecular weight and as a consequence the number of units characterized by $n$ in the polymer chain. The general insolubility of the polymer is presumably due to a cross-linking to some degree because of its infusible character.

EXAMPLE II 0.22 gram of poly(butynediol) was fashioned into a pellet of 12.9 mm. in diameter and 1.5 mm. in thickness in a Loomis press at 3.8 tons/sq. in. The pellet showed a specific resistance of $1.15 \times 10^4$ megohms-cm. at 125° C., and $2.0 \times 10^3$ megohm-cm. at 175° C. These results clearly indicate the semi-conducting properties of the poly(butynediol).

EXAMPLE III

One gram of poly(butynediol) and one gram of potassium nitrate were mixed and ground to a powder. The powder was packed tightly in a test tube and the tube heated until ignition of the powder took place. At this point, the powder burned fiercely with evolution of a great amount of heat, light (flame) and smoke. These results indicate the utility of poly(butynediol) as a useful component in a solid rocket fuel composition.

I claim:
1. A light colored solid homopolymer of 2-butynediol-1,4 which is infusible and insoluble in water, alcohols, tetrahydrofuran and benzene, said homopolymer obtained by the process which consists of refluxing for 24 hours a solution of 2-butynediol-1,4 and bis(triphenylphosphine) nickel bromide in purified tetrahydrofuran and recovering the said homopolymer.

References Cited
UNITED STATES PATENTS
2,542,417  2/1951  Kleinschmidt _____ 260—611

JOSEPH L. SCHOFER, Primary Examiner.
H. WING, JR., Assistant Examiner.